US012305961B2

(12) United States Patent
Laguarda et al.

(10) Patent No.: US 12,305,961 B2
(45) Date of Patent: May 20, 2025

(54) DEVICE AND METHOD FOR SHOT ANALYSIS

(71) Applicant: THALES, Courbevoie (FR)

(72) Inventors: Joachim Laguarda, Paris (FR); Kévin Ly Van, Pontoise (FR)

(73) Assignee: THALES, Courbevoie (FR)

( * ) Notice: Subject to any disclaimer, the term of this patent is extended or adjusted under 35 U.S.C. 154(b) by 845 days.

(21) Appl. No.: 17/428,158

(22) PCT Filed: Feb. 18, 2020

(86) PCT No.: PCT/EP2020/054254
§ 371 (c)(1),
(2) Date: Aug. 3, 2021

(87) PCT Pub. No.: WO2020/169613
PCT Pub. Date: Aug. 27, 2020

(65) Prior Publication Data
US 2022/0049931 A1    Feb. 17, 2022

(30) Foreign Application Priority Data

Feb. 19, 2019 (FR) ...................................... 1901626

(51) Int. Cl.
F41G 3/26         (2006.01)
G06T 7/20         (2017.01)

(52) U.S. Cl.
CPC .............. F41G 3/2605 (2013.01); G06T 7/20 (2013.01); G06T 2207/10016 (2013.01)

(58) Field of Classification Search
CPC .......... F41G 3/2605; G06T 7/20; G06T 2207/10016
See application file for complete search history.

(56) References Cited

U.S. PATENT DOCUMENTS

| 8,022,986 B2 | 9/2011 | Jekel | |
| 2010/0221685 A1* | 9/2010 | Carter | F41A 33/00 434/19 |
| 2012/0126002 A1* | 5/2012 | Rudich | F41G 1/54 235/404 |
| 2012/0178053 A1 | 7/2012 | D'Souza et al. | |
| 2013/0040268 A1 | 2/2013 | Van Der Walt et al. | |
| 2014/0028856 A1 | 1/2014 | Ehrlich | |
| 2014/0215876 A1* | 8/2014 | Popa-Simil | F41G 3/12 42/1.06 |
| 2018/0100721 A1* | 4/2018 | Lee | H04N 23/69 |
| 2021/0372738 A1* | 12/2021 | Laguarda | F41G 3/2688 |

FOREIGN PATENT DOCUMENTS

| EP | 0 985 899 A1 | 3/2000 | |
| EP | 2894430 A1 * | 7/2015 | F41A 19/01 |
| WO | WO-2015199780 A2 * | 12/2015 | F41G 3/02 |

* cited by examiner

Primary Examiner — Mohamed K Amara
(74) Attorney, Agent, or Firm — BakerHostetler

(57) ABSTRACT

A device and a method for shot analysis are provided. The method includes steps of detecting the firing of a shot; recording image data in the line of sight before the shot, immediately following the shot, and after the shot; analyzing the resolution of the shot by processing the data recorded immediately following the shot; and temporal analysis of the shot by processing the data recorded immediately following the shot, the data recorded before the shot, the data recorded after the shot and the results of the shot resolution analysis.

13 Claims, 3 Drawing Sheets

DEVICE AND METHOD FOR SHOT ANALYSIS

CROSS-REFERENCE TO RELATED APPLICATIONS

This application is a National Stage of International patent application PCT/EP2020/054254, filed on Feb. 18, 2020, which claims priority to foreign French patent application No. FR 1901626, filed on Feb. 19, 2019, the disclosures of which are incorporated by reference in their entirety.

FIELD OF THE INVENTION

The invention relates to the field of shot analysis, and relates to a device and a method for automated analysis of a shot, in particular in the field of training.

BACKGROUND

In shooting training, it is necessary to be able to provide an assessment, reliably and in real time, of the projectile shots fired, whether real or simulated. Such requirements demand certain features from the analysis systems conceived. They must have a precision comparable to that which would be obtained in real situations, while being unobtrusive, i.e. requiring the least possible additional equipment mounted on the weapon used.

These requirements must address a number of practical operational obstacles such as the weight of the additional equipment installed, the performance (precision and latency), and the autonomy of the kit, as well as technological obstacles which are mainly the precision of the data recorded and analyzed, the reliability of the image analysis, the minimum computing power installed in the device, and the speed and consumption of the wireless link.

Currently, there are a number of methods for simulating projectiles in shooting training. A technique most commonly used is the a posteriori observation of the accuracy of the shot. If the shot is fired at a target, then the target serves as a support for checking the accuracy of the shot fired. If the shot is fired at a real target, then the accuracy of the shot is analyzed by way of the impact of the ammunition (real or via a paintball for example). Another technique is to film the target via an external device allowing the user to check the accuracy of the shot. A last approach is to use a laser system coupled to the firing of the shot and analyzed by an external device, for example by means of markers mounted on the potential targets which transmit the information to a central system whether there is an impact or not.

The following references are an illustration of various devices of the prior art: EP 0985899 A1 proposes a compact device for recording video images which may be mounted on a gun and used to record video images before and after the firing of the gun. The recording device comprises a camera comprising a lens and a video image sensor. The video recording device is mounted on the gun such that the viewing area of the camera comprises the target area of the gun. The video image sensor generates an electronic signal representative of a video image impinging on the respective sensor. The output of the image sensor is processed and generally employed to produce successive frame data which are sequentially stored in locations of a semiconductor memory organized as a circular buffer memory while the video recording device is in an active state. When the gun is fired, additional frames are stored in the buffer memory for a short period of time and a portion of the buffer memory is employed to keep a video record of the shooting both before and after the event. Additional frames are successively stored in the unused portion of the buffer memory.

U.S. Pat. No. 8,022,986 by Jekel provides a weapon orientation measurement device which comprises a processor configured to receive first location information indicative of the locations of a first and a second point on a weapon, the first and second points being a known distance apart in a direction parallel to a pointing axis of the weapon, and to receive second location information indicative of the locations of the first and second points on the weapon. The processor is further configured to receive information indicative of a first terrestrial orientation and to determine a second terrestrial orientation corresponding to the weapon based on the first and second location information and the information indicative of the first terrestrial orientation. The first location information represents a location relative to a first sensor at a first location and the second location information represents a location relative to a second sensor at a second location, and the first and second sensors are separated by a given distance.

Patent application US 2012/0178053 A1 by D'Souza et al. relates to a method and system for a shooting training system which automatically predicts the ballistics based on automatically gathered meteorological and distance information. The projectile shooting training system also confirms that manual efforts performed by an operator to adjust the sight turrets would or would not result in hitting the target after firing a shot. Both adjustment of the turrets and target settings are used to distinguish between the following states after firing a shot: hit; kill; miss; near miss. A light or other signal is sent from the weapon to the target to indicate that a shot was fired by the weapon.

The drawbacks of the existing methods are that, in general, shooting training requires an assessment of the shot fired to be provided in a way that is as close as possible to real ballistics while being free from the associated dangers. As a result, the analysis of a shot may be seen as a marking problem in which it is necessary to be able to label a target through certain opaque obstacles and fuzzy obstacles, or even via a curved trajectory.

A method known for more than 20 years for tackling this problem consists in equipping the potential targets with photosensitive sensors that are able to send information when they are illuminated by a laser. This method has several drawbacks: attenuation of the laser over great distances, the inability to shoot through fuzzy obstacles (e.g. foliage), and the need to equip the target with enough photosensitive sensors, among others.

To be usable, digital marking must be able to simulate a shot by assigning the impact of the bullet a random distribution close to that of a real shot. However, the techniques currently proposed do not allow this problem to be solved in a satisfactory manner.

In addition, it is also a matter of being able to present the results of a shot quickly and in a synthetic manner, by indicating and identifying which object in a scene was hit.

There is no known system that combines the various detection, recording and image analysis technologies for an indoor and outdoor environment. There is no comprehensive system that allows real-time recording and analysis of the shots fired by a weapon that can be used anywhere, anytime and does not involve any modification of the weapon other than the addition of an autonomous and removable kit.

The present invention proposes to meet these needs.

SUMMARY OF THE INVENTION

One object of the present invention is to provide a device that is autonomous in terms of power and computing, capable of detecting the departure of a shot and of recording, via an electro-optical device, the place and time of the impact of the ammunition, if present, or the calculation-simulated position of the impact in the case of a blank without any real impact being used.

Advantageously, the device of the invention is available in the form of a kit that can be added in a straightforward manner to the rails of a weapon (for example to a MIL-STD 1913 "Picatinny" rail).

Another object of the present invention is to provide a method for precisely analyzing the performance of a shot which allows the real-time generation of a report on the accuracy of an impact, and the recording thereof for future reference.

The device of the invention has a number of advantages:
  it is miniaturized, with a simple and extensible architecture;
  it is inexpensive, in that, on the one hand, the sensors required to produce the proposed system are low-cost (sensors that are common on the market, such as those fitted to smartphones for example, may be used), and in that, on the other hand, image capture and the associated calculations are performed only at the time of firing, allowing substantial power savings and making the proposed solution viable for application in the military domain;
  it is weapon-mounted and completely autonomous;
  it may be used anywhere and anytime, indoors and outdoors without additional instrumentation;
  it may be used day and night by virtue of the use of IR cameras;
  the shooters environment does not need to be instrumented;
  it is compatible with:
    live ammunition;
    dummy ammunition (paintballs for example);
    compressed air simulation systems (of "Airsoft" type)
  the report may be used directly by the user on a smartphone, tablet or a virtual reality headset;
  the analysis of a shot is performed on the basis of the analysis of the movement of the weapon and the posture of the shooter, a ballistics calculation is performed according to the ammunition used, and, during firing, there is precise, automated and real-time identification of an impact (which entity, which part of the entity) allowing a damage level of the impacts to be determined;
  in the case of a multi-shot automatic weapon (submachine gun), each impact may be analyzed individually;
  the device may be deployed and used anywhere, without special instrumentation;
  there is no longer any need to know the position or the direction of the weapon.

The invention is advantageously applicable in the field of simulation, and more particularly in the context of military or police training, for which it is necessary to be able to mark targets realistically without having to use real projectiles for safety reasons. More generally, the invention may also be implemented for an application dedicated to military joint training exercises, with weapon frames that are much larger than light weapons such as the one described by way of example.

In one embodiment, the device of the invention may be coupled to an effector system, thus making it possible to simulate an impact on a target or on an individual instrumented with this same effector, whether light-based or via vibrations.

In one embodiment, the device of the invention may be used to calculate a trajectory through traversable obstacles (a door, foliage, etc.) and thus overcome the limitations (inaccuracy of laser over long distances, and the need for a direct line of sight to the target) of laser equipment (laser CTS combat shooting simulator).

In one embodiment, the device of the invention may be coupled to an array of sensors arranged on the ground, and thus allow a realistic calculation of a trajectory by taking into account parameters such as wind, air pressure, and air humidity.

To meet these objectives, the subject of the invention is a device for analyzing the impact of a shot from a weapon on a target, comprising:
  a data acquisition module able to determine the time of departure of a projectile from a weapon and to acquire video and spatial data relating to a targeted target;
  a storage and calculation module able to analyze the acquired temporal, video and spatial data; and
  a data transmission module able to transmit the analyzed data.

According to some alternative or combined embodiments:
  the data acquisition module is composed of at least one inertial unit able to detect the movement of the breechblock of the weapon, of a rangefinder able to acquire data on the distance from the targeted target, at least one camera able to acquire line-of-sight images.
  the data acquisition module comprises two multispectral and multifield cameras.
  the data transmission module allows transmission via a wireless link.
  the calculation and storage module comprises at least a computer, a data storage capability, a learning database and a real-time clock.

The invention also covers a firearm comprising a device as claimed.

The invention also covers a shooting simulator comprising a device as claimed.

Another subject of the invention is a method for analyzing the impact of a shot from a weapon on a target, which comprises the following steps:
  detecting the firing of a shot;
  recording line-of-sight image data before the shot, immediately after the shot, and after the shot;
  analyzing the resolution of the shot by processing the data recorded immediately after the shot; and
  temporally analyzing the shot by processing the data recorded immediately after the shot, the data recorded before the shot, the data recorded after the shot, and the results of the analysis of the resolution of the shot.

In one embodiment, the method comprises a step of generating a shot resolution analysis report, and a shot temporal analysis report.

In one embodiment, the method comprises a step of sending the analysis reports.

In another aspect, the invention covers a computer program product comprising non-transitory code instructions making it possible to perform the steps of the method as claimed when said program is run on a computer.

BRIEF DESCRIPTION OF THE DRAWINGS

Various aspects and advantages of the invention will appear in support of the description of one preferred, but non-limiting, implementation of the invention, with reference to the figures below in which.

DETAILED DESCRIPTION

Figure 1:
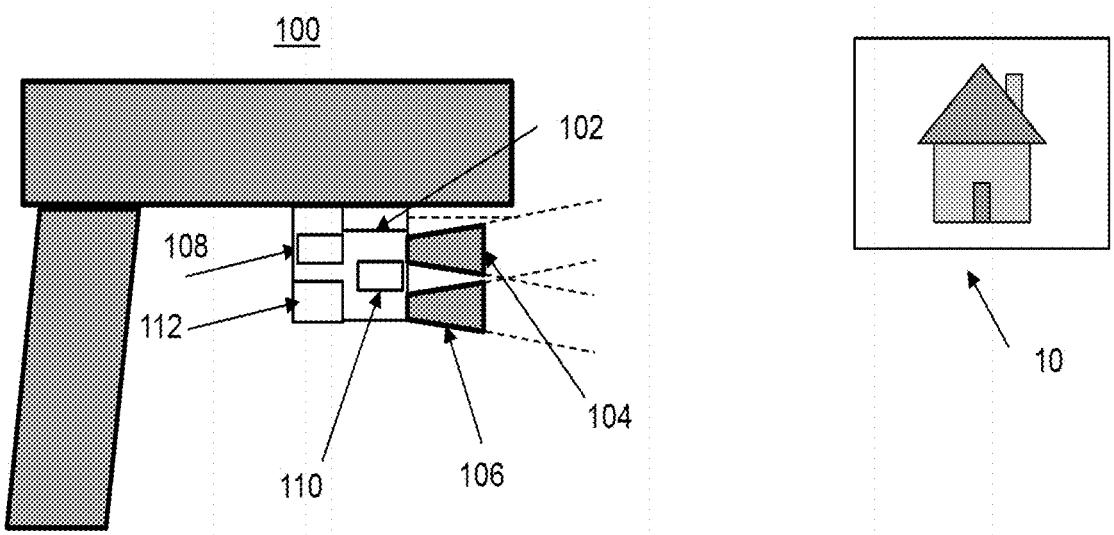
FIG. 1 schematically illustrates the device of the invention in one embodiment.

In general, to address the stated problem, the device (100) of the invention is shown in FIG. 1 as being fitted to a weapon. It mainly consists of:
- a data acquisition module (102, 104, 106, 108);
- a storage and calculation module (110); and
- a data transmission module (112).

More precisely, in one embodiment of the device of the invention with which to equip a weapon, the data acquisition module is composed of at least one rangefinder (102) able to acquire data on the distance from a target (10), at least one camera (104, 106) able to acquire line-of-sight images and at least one inertial unit (108) of three-axis IMU type able to detect the movement of the breechblock of the weapon at the time of firing of a shot. However, the data acquisition module may be adapted according to the operational context, such as, for example, for short-range shots, it requires only one wide-field camera, and an IMU. In another embodiment, the module includes two cameras (104, 106) having different field widths, one wide-field and the other narrow-field.

The storage and calculation module (110) allows the analysis, processing and storage of data. In one embodiment, it is composed of a computer using resources of CPU type and of GPU type (dedicated to calculations performed by neural networks for example), of a learning database (208) comprising information relating to targets (people, vehicles, etc.) used for target detection calculations, and a data storage capability (210). The calculation module also comprises a real-time clock which ensures precise timing of the collected data without drift.

The data transmission module (112) allows communication to a remote device, preferably via a wireless link.

Figure 2:
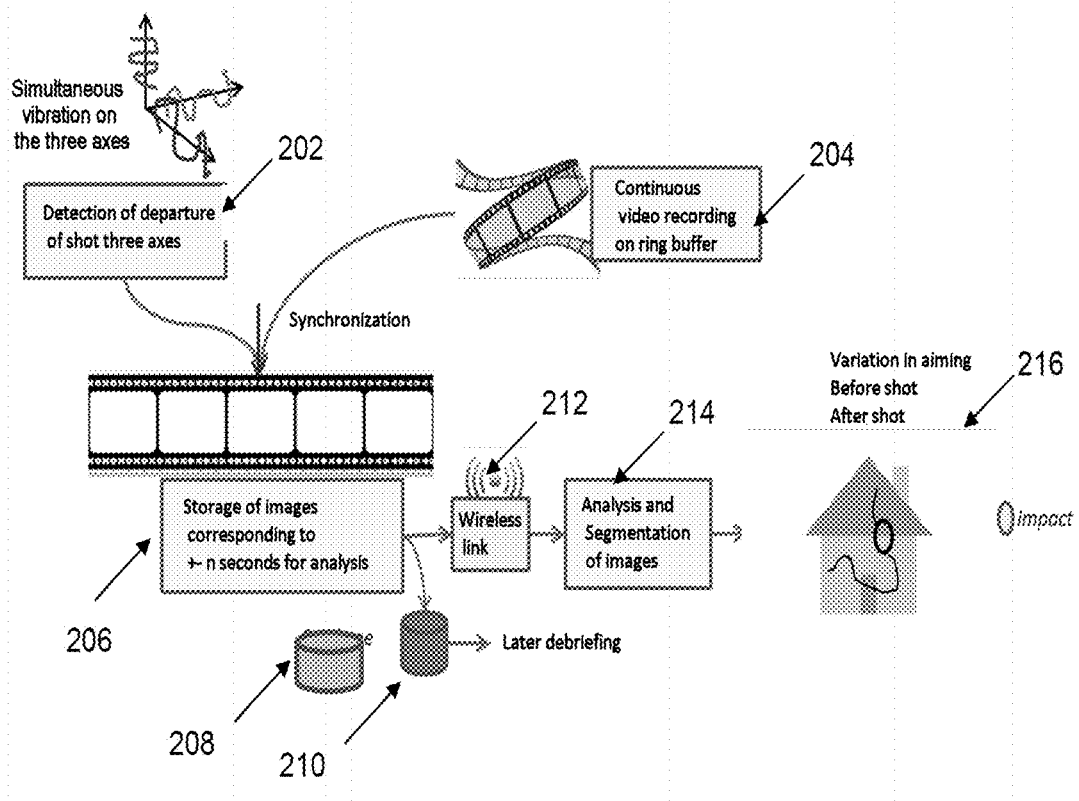
FIG. 2 schematically illustrates the general functions performed by the various components of the device of the invention.
Figure 3:
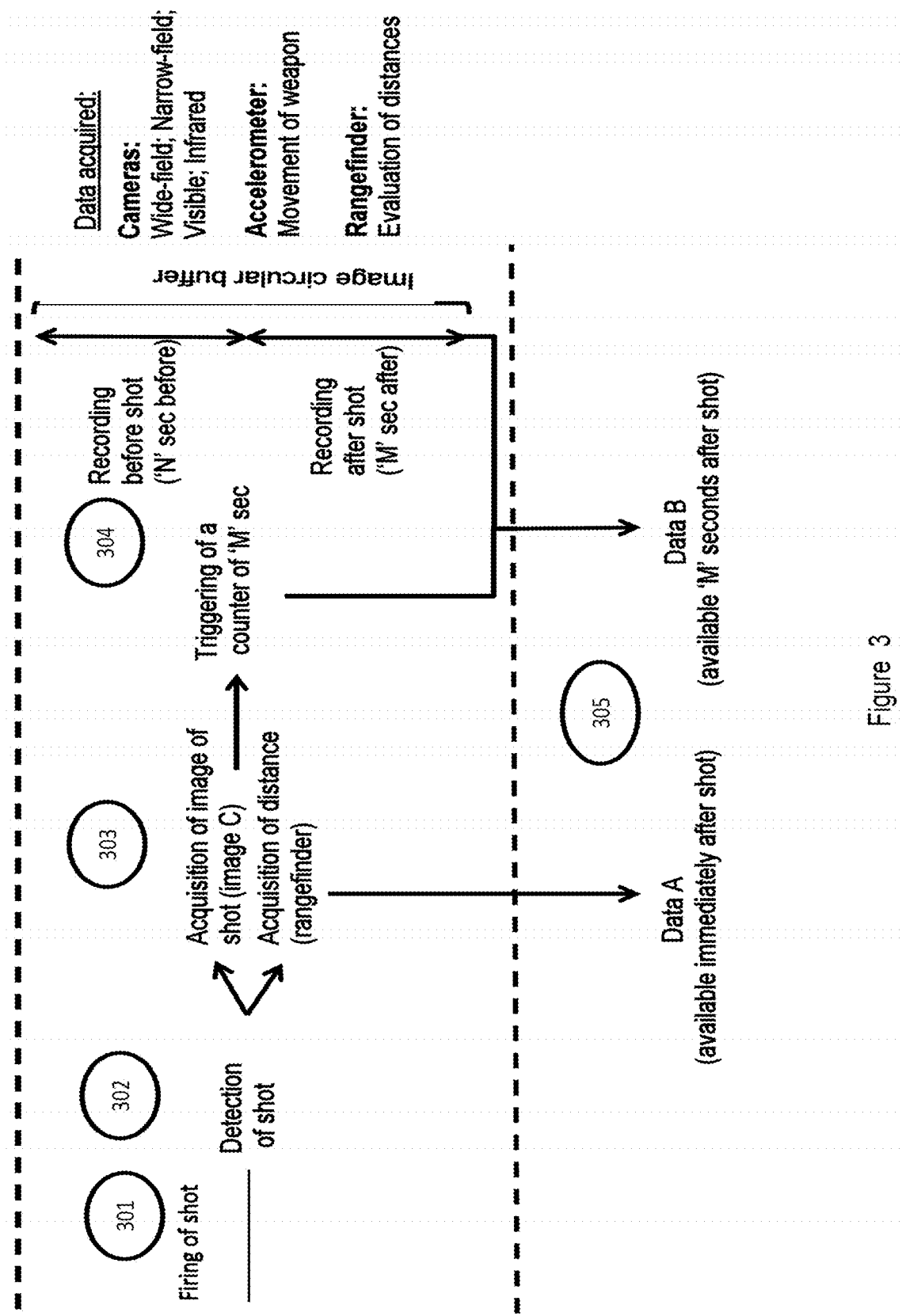
FIG. 3 schematically illustrates the data recording phase according to one embodiment of the method of the invention.
Figure 4:
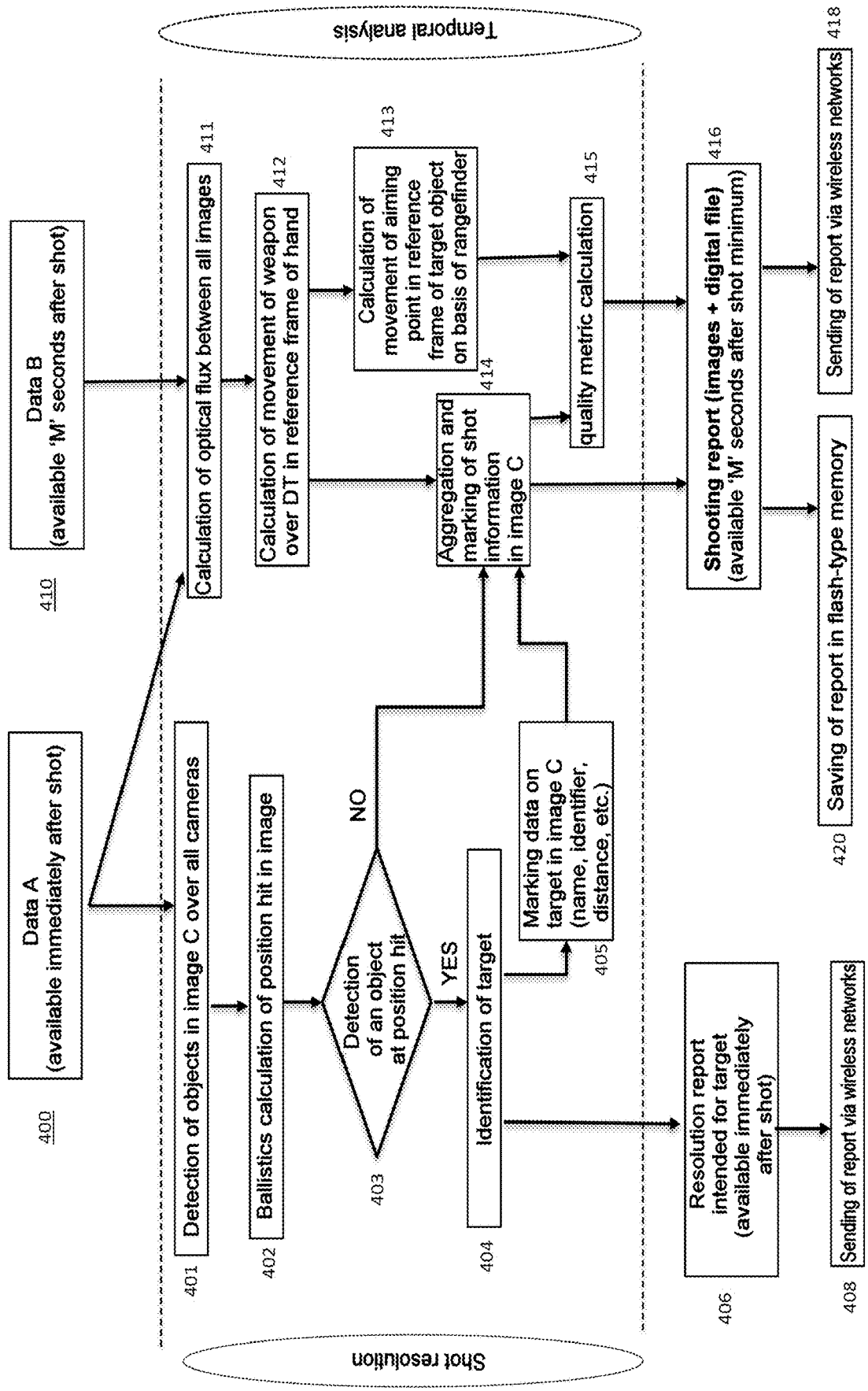
FIG. 4 schematically illustrates the data processing phase according to one embodiment of the method of the invention.

FIG. 2 schematically illustrates the general functions performed by the various components of the device of the invention, and FIGS. 3 and 4 describe them in detail.

The analysis method begins with the detection of the firing of a shot (202). The time of departure of a projectile is measured by the sensors of the inertial unit (108) which detect the movement of the breechblock of the weapon, i.e. the simultaneous vibrations on the three axes.

The detection of the time of departure of the shot triggers the recording (204) of the views by the one or more cameras (104, 106). The target (10) targeted by the barrel is digitally recorded electro-optically by means preferably of a plurality of cameras, which are both multispectral (visible/infrared) and multifield, and this is done for the entire time that the ammunition is in motion as well as after impact. In order to determine the line of sight, the device uses a real wide-field image and a real narrow-field image, the images being obtained during the aiming captured by the high-resolution multispectral camera system. Switching from wide field to narrow field is done automatically based on a distance criterion in order to ensure optimal resolution for the subsequent segmentation (214) of the image. Preferably, two cameras are used, each camera being calibrated independently to allow ballistics and parallax correction by the calculation module.

The digital video recording (204) taken by all of the sensors is stored and analyzed (206) directly by the computer (110) installed in the device. The computer that analyzes the images from the cameras is able to:
- calculate the impact position in the image;
- detect and recognize the elements hit in the image (people, animals, objects).

Those skilled in the art understand that the present invention may be implemented on the basis of hardware and software elements. The data processing may be performed by a computer program product comprising non-transitory code instructions.

A synchronization mechanism allows the data recorded by all of the components to be synchronized in order to ensure the coherence of the debriefing information.

The images are stored in the embedded memory (210). If broadcast mode is activated, these images are transmitted (212) to an external device (216) in real time for analysis and segmentation (214) in order to check the variation in the aiming before and after the shot.

The operation of the system may be divided into two main phases: a first phase of recording data shown in FIG. 3, and a second phase of processing data shown in FIG. 4.

The data recording phase consists of the following sequence of steps:

301: Firing of the shot: the operator pulls the trigger of the weapon.

302: Detection of the shot:
- the accelerometer (IMU) detects the movement of the breechblock; and
- the computer interprets the movement of the breechblock over a time window in order to deduce therefrom the firing of the shot by comparison with a pre-recorded shot signature.

303: Recording of the data "A" available immediately after the shot:
- retrieving the image at the time of the shot from a circular buffer. This image is denoted image 'C' (for central);
- acquiring the distance from the target using the rangefinder; and
- generating a packet of data "A" sent to the computer for processing.

304: Recording of the data "B" available 'M' seconds after firing:
- triggering a wait loop for M seconds. In one embodiment, the parameter 'M' may be set to M=1 second;
- at the end of the wait, retrieving the images corresponding to 'N' seconds before firing and to 'M' seconds after firing from the circular buffer. In one embodiment, the parameter 'N' may be set to N=2 seconds; and
- generating a packet of data "B" sent to the computer for processing.

305: End of recording

The data processing phase illustrated in FIG. 4 comprises two processing sequences carried out in separate processes (400, 410). A first sequence (400) is dedicated to the resolution of the shot. It is very fast (of the order of the time of flight of the ammunition) and is based only on the "A" data available immediately after firing. A second processing sequence (410) is slower and allows temporal analysis of the shot. It is based on the data "A" and "B" and on the first sequence, and allows the generation of a shooting report.

The first sequence (400) of processing the data "A" allows analysis of the resolution of a shot, and comprises the following steps:
- 401: Detection of the objects present in the image C via detection and recognition algorithms. This step allows the identification of static targets, humans, items of interior or street furniture, weapons, vehicles, etc.
- 402: Ballistics calculation. This step allows the determination of the position hit by the ammunition in the image C, using the data from the rangefinder, the projection information from the one or more cameras and the ballistic profile of the weapon and its ammunition.
- 403: Detection of the target object: if an object detected in the preceding step is present at the position hit by the ammunition in the image (calculated in step 6), the method moves on to the next step 404, otherwise the process of the first sequence stops and the ballistics information is passed on to the second sequence.
- 404: Identification of the target (known person, target of a certain type, particular vehicle, etc.). In the case of an object comprising identified sub-parts, the method allows the identification of the sub-part hit. For example, for a human, an arm, a torso, a leg or a head.
- 405: Marking and recording of the identification and ballistics data in the image C. Communication of this information for the second sequence.
- 406: Establishment of a report intended for the target hit to notify them that they have been hit.
- 408: Optional sending of the report via wireless link.

The second data processing sequence (410) allows temporal analysis of the shot, and comprises the following steps:
- 411: Calculating the optical flux in order to deduce therefrom the deviation of the weapon in pixels, before and after the shot.
- 412: Using the projection parameters of the camera to calculate the angular motion of the weapon (in degrees).
- 413: Using the information on the distance from the target to calculate the linear motion of the aiming point in the reference frame of the target (in meters).
- 414: Aggregation and marking of the shooting information in the image C:
  line-of-sight movement;
  target identification data (if available);
  point of impact calculated by ballistics;
- 415: Generation of quality metric data for the shot fired:
  deviation of the weapon;
  shooting score if the target hit allows a score to be established;
  others, etc.
- 416: Establishment of a digital shooting report: generation of a synthesis report (image, data file).
- 418: Optionally sending, via wireless link (4G, 5G, Bluetooth, Wi-Fi) to a remote computer (tablet, smartphone, augmented reality headset) for viewing by an instructor; and
- 420: Saving of the report on static memory, flash-type memory.

The present description illustrates one embodiment of the invention, but is not limiting. The example was chosen to allow a good understanding of the principles of the invention, and one specific application, but it is not exhaustive, and the description should allow a person skilled in the art to provide modifications and implementational variants while keeping the same principles. Thus, for example, it is conceivable to extend the functionalities of the system by adding, for example, a player positioning system in the case of a joint training exercise involving large movements.

The invention claimed is:

1. A method for providing an analysis of a shot of a real or simulated projectile from a weapon on a target, comprising the following steps:
   detecting a time of departure of a shot;
   recording line-of-sight image data before the shot, immediately after the shot, and after the shot;
   recording an image C at the time of departure of the shot;
   generating a packet of data "A" with the line-of-sight image data immediately after the shot;
   generating a packet of data "B" with the line-of-sight image data during a predefined time of 'M' seconds after the time of departure of the shot and line-of-sight image data recorded during a predefined time 'N' seconds before the time of departure of the shot;
   analyzing the resolution of the shot by processing the packet of data "A" to determine if an object which is present on the image C is at a point of impact of the projectile, and in case the object is at a point of impact, identifying the object;
   temporally analyzing the shot by a combined processing of the packet of data "A", the packet of data "B", and the results of the analysis of the resolution of the shot, the combined processing providing a deviation and an angular motion of the weapon;
   marking shooting information on the line-of-sight image; and
   generating quality metric data for the shot.

2. The method as claimed in claim 1, wherein the step of detecting the firing of a shot comprises the steps of:
   detecting the movement of the breechblock of the weapon; and
   calculating, from the detected movement of the breechblock, the time of departure of a projectile.

3. The method as claimed in claim 1, wherein the step of recording line-of-sight image data immediately after the shot comprises the steps of:
   acquiring a line-of-sight image at the time of the shot;
   acquiring the distance from the target; and
   generating a packet of line-of-sight image data immediately after the shot.

4. The method as claimed in claim 1, wherein the step of recording line-of-sight image data before the shot and line-of-sight image data after the shot comprises the steps of:
   triggering a wait period 'M';
   retrieving, at the end of the wait period, line-of-sight images for a wait 'N' before firing and line-of-sight images for a wait 'M' after firing; and
   generating a packet of line-of-sight image data before the shot and of line-of-sight image data after the shot.

5. The method as claimed in claim 1, wherein the step of analyzing the resolution of the shot comprises the steps of:
   detecting objects present in the line-of-sight image at the time of the shot;
   determining, in the line-of-sight image at the time of the shot, the position hit by the shot;

determining whether a detected object is at the position hit by the shot:
if a detected object is present at the hit position, identifying the object and marking the object identification and ballistics data in the line-of-sight image at the time of the shot;
if there is no detected object at the hit position, generating ballistics information.

6. The method as claimed in claim 5, further comprising, after the step of identifying the object, a step of establishing a shot resolution report.

7. The method as claimed in claim 6, further comprising a step of sending the analysis reports.

8. The method as claimed in claim 1, wherein the step of temporally analyzing the shot comprises the steps of:
determining the deviation of the weapon, before and after the shot;
calculating the angular motion of the weapon;
calculating the linear motion of the aiming point in the reference frame of the target;
aggregating and marking the shooting information in the line-of-sight image at the time of the shot; and
generating quality metric data for the fired shot.

9. The method as claimed in claim 8, further comprising step of establishing a shot temporal analysis report.

10. A computer program product, comprising non-transient code instructions making it possible to perform the steps of the method as claimed in claim 1, when said program is run on a computer.

11. A device for providing an analysis of a shot of a real or simulated projectile from a weapon on a target comprising a data acquisition module, a storage and calculation module, and a data transmission module, which are configured to implementing the steps of the method as claimed in claim 1.

12. A firearm comprising a device as claimed in claim 11.

13. A shooting simulator comprising a device as claimed in claim 11.

* * * * *

UNITED STATES PATENT AND TRADEMARK OFFICE
CERTIFICATE OF CORRECTION

PATENT NO. : 12,305,961 B2
APPLICATION NO. : 17/428158
DATED : May 20, 2025
INVENTOR(S) : Joachim Laguarda et al.

Page 1 of 1

It is certified that error appears in the above-identified patent and that said Letters Patent is hereby corrected as shown below:

In the Claims

In Claim 11, Column 10, Line 14, "which are configured to implementing the steps" should be
-- which are configured to implement the steps --.

Signed and Sealed this
Eighth Day of July, 2025

Coke Morgan Stewart
*Acting Director of the United States Patent and Trademark Office*